3,219,011
COATING APPARATUS INCLUDING IMPROVED MOUNTING FOR APPLICATOR ROLL
Gary Henry Steinhardt, 15 Glanbeam Road, Stanmore, Middlesex, England, and Philip Henry Boulter, 20 Arundel Drive, Boreham Wood, England
Filed July 5, 1962, Ser. No. 207,586
5 Claims. (Cl. 118—249)

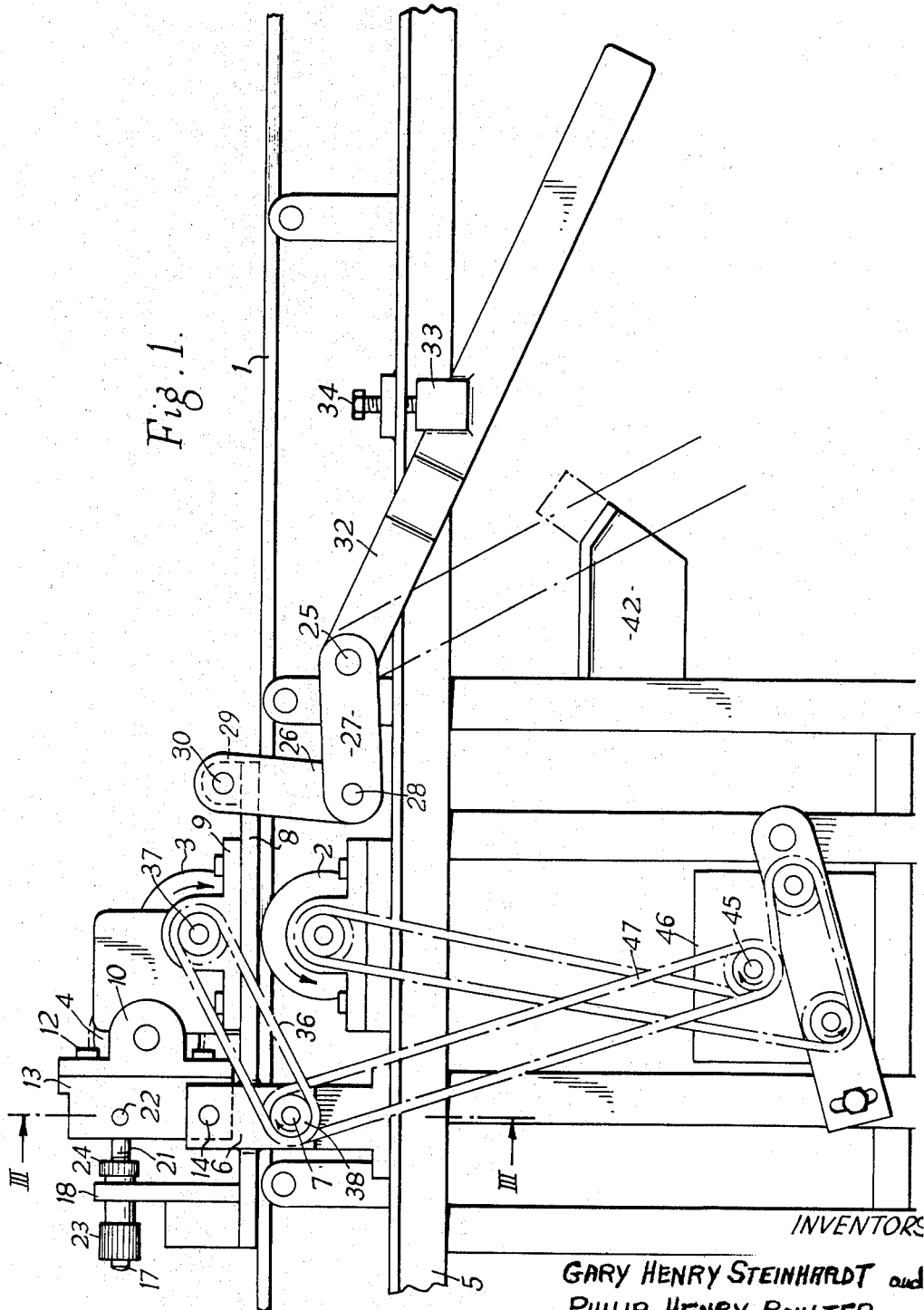

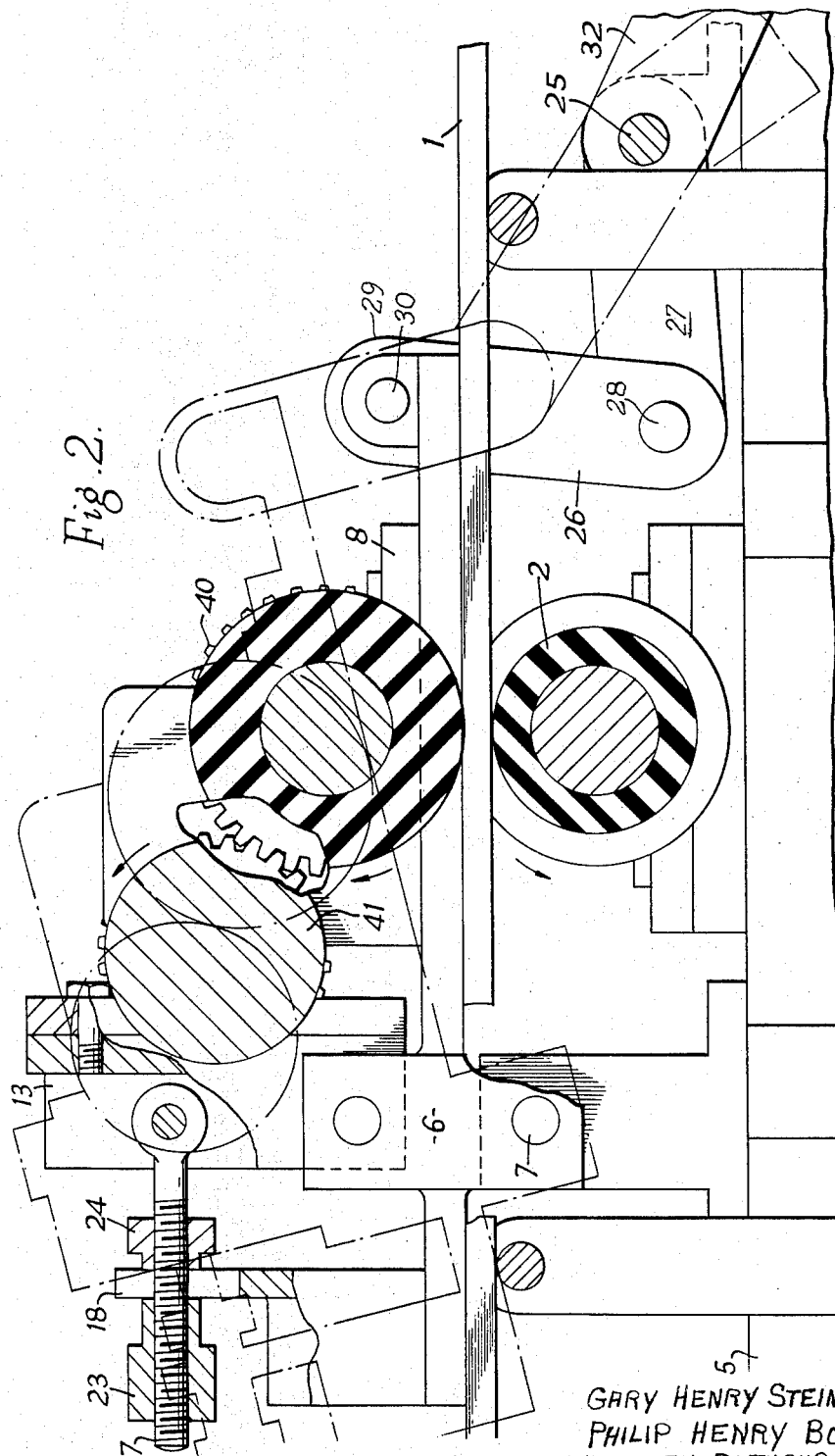

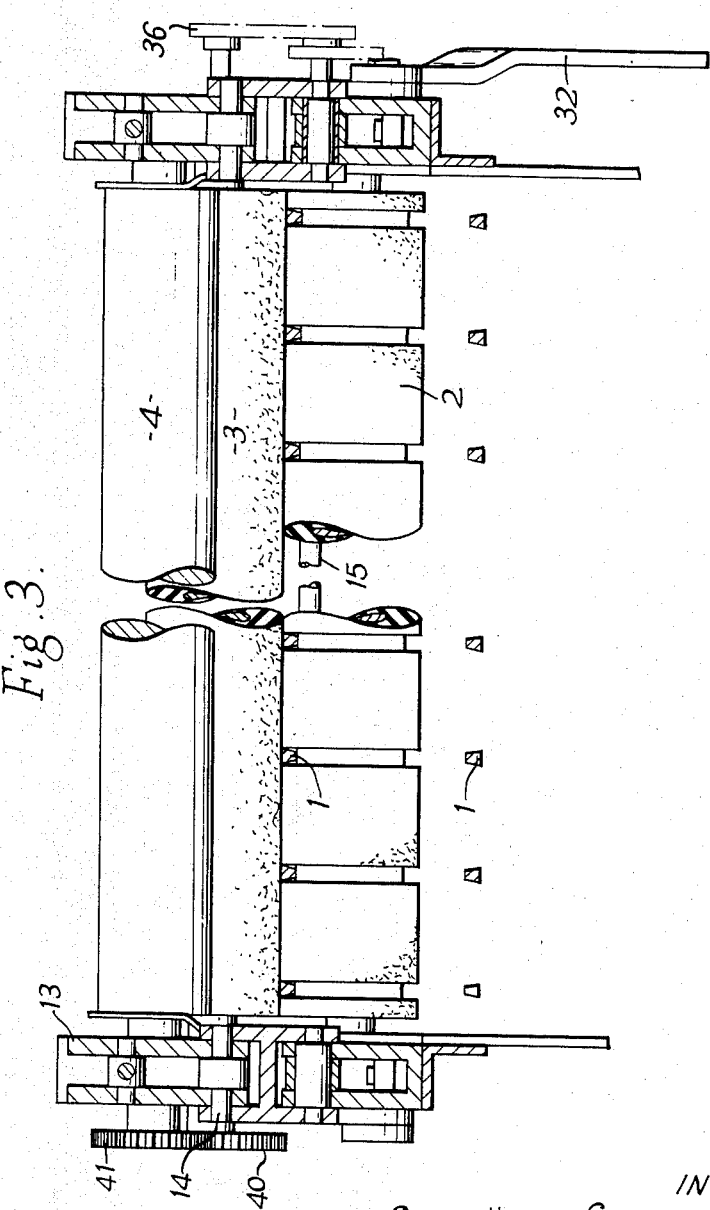

This invention relates to improvements in machines for the continuous processing of sheet material, such as for example sheet metal or glass, and more particularly to processing machines for the continuous application of liquids, such as paint, to sheet material by contact with one or more rollers.

An object of the invention is to provide a machine for this purpose which will be convenient and reliable in use.

Another object of the invention is to provide a machine which can readily be employed for the processing of sheet material of different thicknesses.

In processing machines of the kind referred to above, difficulty is ofen caused by the fact that the material to be processed is not of truly uniform thickness. In some cases local variations in the thickness of the material may be so great that irregularities in the surface of the material cause the roller or rollers to be damaged. This is particularly the case when the roller or rollers is or are made of or covered by relatively soft material such as rubber.

It is therefore a further object of the invention to provide a processing machine with which this difficulty is overcome, or at least reduced.

According to the present invention there is provided a machine for the continuous processing of sheet material, which includes means to support the material being processed during its passage through the machine and at least one application or treatment roller which is adapted to contact the surface of the material passing through the machine, wherein the application or treatment roller is adjustably supported to allow movement of the roller towards and away from the support and to maintain the roller in parallel relationship to the support during such movement.

The spacing between the application or treatment roller and the support may be adjusted to suit different thicknesses of material to be processed. Preferably, however, the arrangement is such that, while the application or treatment roller is maintained at a predetermined minimum distance from the support there is provision to allow at least limited movement of the roller further from the support so as to allow for variations in the thickness of the material in excess of the nominal minimum.

One particular form of machine constructed in accordance with the invention, will now be described in greater detail, by way of example only, with reference to the accompanying drawings in which:

FIG. 1 is a side view of the machine,

FIG. 2 is a part sectional side view of part of the machine with the application and furnishing rollers shown by dotted outline in a raised position, and FIG. 3 is a part sectional view on the line III—III of FIG. 1.

The material being processed is supported by the upper flights of a number of parallel circulating belts 1. At an intermediate point along their upper flights, the belts 1 pass between two transverse rubber rollers 2 and 3 which are driven in opposite directions of rotation so as to apply a positive feeding action to sheet material supported and supplied thereto by the belts 1. The roller 2 may be designated as the drive roller and the roller 3 the treatment or application roller. The roller 2 is provided with grooves which accommodate the belts 1 so that when the material passes between the rollers 2 and 3 the material is positively driven by the roller 2.

In addition to these two rubber rollers 2 and 3, the machine also includes a steel paint-furnishing roller 4 which is mounted for rotation about an axis parallel to the axis of the upper rubber roller 3, in the opposite direction to and in contact with or slightly spaced from the latter. In this way paint supplied to the fissure or cleft between the rollers is applied to the surface of the upper rubber roller 3, for subsequent application to the upper surface of sheet material passing through the machine.

The lower rubber roller 2 is mounted directly on the main frame 5 of the machine but the upper rubber roller 3 (hereinafter termed an application or treatment roller) and its furnishing roller 4 extend between two cantilever members 6, which are mounted on opposite sides of the machine frame 5 for pivoting movement about a common horizontal axis 7. Each cantilever member consists of an elongated bracket 8 adjacent one end of which the point of horizontal pivotal axis 7 to the main frame 5 is located, and an arm 9 which extends from the bracket at a point spaced from the pivoted axis 7.

The application roller 3 is rotatably mounted between the two arms 9. The furnishing roller 4, on the other hand, extends between two brackets 10 which are attached by bolts 12 to channel shaped members 13 pivotally connected to the cantilever members 6 by pivot pins 14 (FIG. 3). A screw-thread adjuster 17 is provided on each side of the machine between an upstanding flange 18, fixed at one end of the bracket 8 and the members 13 so that the spacing, or when they are in contact, the pressure between the furnishing roller and the application roller may be varied.

Each adjuster 17 has a threaded shaft 21 which is fixed at one end between the side walls of the channel members 13 by a pivot pin 22. The other end of the shaft 21 passes through the flange 18 and knurled nuts 23 and 24 are provided on opposite sides of the flange 18, adjustment being provided by rotation of the nuts 23 and 24 in a conventional manner.

The spacing between the application roller 3 and the furnishing rollers 4 may, if necessary, be increased sufficiently to allow the paint lying in the cleft between the rollers to drain away into a paint trough (not shown) which is placed beneath them, during cleaning for example. The cantilever members are urged by a spring (not shown) so as to maintain the application roller 3 in close contact with the surface of the material being processed.

A transverse rod 25 is mounted for oscillation about its own axis on the machine frame 5, parallel to and spaced from the axis of rotation of the lower rubber roller 2. At each of its ends, the rod 25 is connected to the corresponding bracket 8 by means of a pair of crank levers 26 and 27. The two levers 26 and 27 of each pair are pivotally connected to one another at 28 to define a toggle means and lever 26 is pivotally connected at 30 to a lug 29 on the corresponding bracket 8. The other lever 27 is rigidly secured to the rod 25. Preferably the pivotal connections 28 and 30 are effected by means of friction-free bearings such as ball-bearings.

In use, movement of either end of the application roller 3, towards or away from the lower roller 2, giving rise to pivoting of the corresponding cantilever 6 and bracket 8 causes relative pivoting movement of the corresponding pair of crank levers 26 and 27 and this applies a torque to the rod 25. This torque causes relative pivoting of the crank lever 26 and 27 of the other pair and thus pivoting of the other cantilever member 6 and bracket 8. In this way, movement of either end of the application roller 3 gives rise to similar movement of the other end thereof. Thus any movement of the application roller 3 is uniform over its whole length, and the roller 3 is maintained in parallel spaced relationship relatively to the lower roller 2 and the belts 1.

One end of a long control lever 32 is rigidly secured to one end of the transverse rod 25. Pivoting movement of the control lever 32 gives rise to turning of the rod 25 and thus to movement of the application roller 3. The control lever 32 carries a block 33 which bears against an adjusting screw 34 carried on the main frame of the machine. By turning the adjusting screw 34 the control lever 32 can be pivoted slightly so as to cause limited movement of the application roller 3 towards or away from the lower roller 2 to suit different thicknesses of sheet material to be processed.

One end of the application roller 3 is driven by means of a chain 36 passing around a sprocket 37 mounted at one end of the roller 3 and around a driven sprocket 38 mounted coaxially with the pivotal axis 7 of the cantilever members 6 to the machine frame 5. The sprocket 38 is driven by a chain 47 which is drawn from a sprocket 45 mounted at the end of a shaft extending from a motor 46. With this arrangement, the chain 36 can circulate freely and continuously despite pivoting of the cantilever members 6, and the drive can be applied to the application roller 3 without giving rise to any lateral displacement thereof. At its other end the application roller 3 carries a second sprocket 40 which engages with a sprocket 41 carried by the furnishing roller 4 so that, as has already been mentioned, the furnishing roller 4 rotates in the opposite direction to the application roller 3. By means of the screw-thread adjuster 17 the positions of the furnishing roller sprocket 41 can be disengaged from the application roller sprocket 40, during cleaning for instance.

Once the adjusting screw 34 has been set to suit a certain nominal material-thickness, which is in the minimum actual thickness of the material, any irregularity in the surface of the material gives rise to a slight movement of the application roller 3 away from the lower roller 2. As has already been made clear, the linkage employed ensures that this movement is uniform along the whole length of the roller 3, irrespective of the location of the irregularity relative thereto.

The adjusting screw 34 may conveniently be calibrated so as to indicate the positions corresponding to nominal material-thickness ranging from, say, 1/16 in. to 1 in. in steps of, say, 1/8 in.

For convenience in carrying out inspection, cleaning or maintenance of the machine, the adjusting screw 34 may be disengaged from its bearing surface and the control lever 32 swung manually through a wide arc until the crank levers 26 and 27 of the respective pairs pass through their dead-centre positions (shown in dotted outline in FIG. 2), the application roller 3 meanwhile moving a substantial distance away from the lower roller 2. The application roller 3 is supported in this raised position by the engagement of the control lever 32 with a stop 42 on the machine frame 5. Since the control lever 32 can be swung into this position without altering the setting of the adjusting screw 34, the application roller 3 can immediately be returned to its previous setting, once the inspection, cleaning or maintenance operation has been completed.

We claim:

1. A machine for continuous processing of sheet material comprising a frame, a horizontally disposed drive roller rotatably mounted on said frame, a pair of spaced cantilever members each having a corresponding end pivotally mounted on said frame on opposite sides thereof about a common horizontal axis parallel with the axis of rotation of said drive roller, a treatment roller supported for rotation by said cantilever members intermediate their ends in parallel relation to said drive roller, a transverse torque rod mounted on said frame to oscillate about its own axis, a pair of toggle members having corresponding ends thereof pivotally connected to the other ends of respective ones of said cantilever members, the other ends of said toggle members being rigidly connected to said rod so that movement of one end of said treatment roller relative to said drive roller effects the same movement of the other end of said treatment roller to maintain said treatment and drive rollers parallel to each other at all positions, and a control lever rigidly connected relative to said transverse rod, said control lever being adapted to pivot said transverse rod to move said treatment roller to a position away from said drive roller.

2. The machine of claim 1 including adjusting means for predetermining the minimum spacing between said treatment roller and said drive roller to accommodate different minimum thicknesses of material passing through said machine.

3. The machine of claim 1 wherein said toggle members are movable by said control lever to over-center positions for locking said treatment roller in a position spaced from said drive roller.

4. The machine of claim 1 wherein said drive roller drives a plurality of spaced parallel endless belts positioned below said treatment roller, said drive roller being provided with a plurality of grooves for receiving said belts whereby sheet material processed by the machine is supported by said endless belts.

5. A machine for continuous processing of sheet material comprising a horizontally mounted drive roller provided with a plurality of grooves, a material support formed of a plurality of parallel circulating belts positioned in respective ones of said grooves and driven by said drive roller, a pair of cantilever members each having one end pivotally mounted on opposite sides of said machine for pivotal movement about a common horizontal axis, a treatment roller mounted between said cantilever members intermediate their ends in parallel relation to said drive roller, two pairs of crank levers, each pair having one end of each lever pivotally interconnected, one pair being mounted on each side of said machine, each pair of said crank levers having the other end of one lever pivotally connected to the other end of a respective cantilever member, a transverse rod mounted on said machine for oscillation about its own axis and rigidly interconnecting the other end of the other of said levers so that movement of one end of said treatment roller relative to said drive roller effects the same movement of the other end of said treatment roller relative to said drive roller to maintain said treatment and said drive rollers parallel to each other at all positions, a control lever rigidly connected relative to said transverse rod, means associated wtih said control lever for adjusting the minimum space between the treatment roller and the drive roller, said control lever being adapted to oscillate said transverse rod to move said treatment roller to positions toward and away from said drive roller, said pairs of crank levers and said control lever being associated in such a manner as to be capable of locking said treatment roller in said last-mentioned position.

(References on following page)

References Cited by the Examiner

UNITED STATES PATENTS

| | | | |
|---|---|---|---|
| 693,832 | 2/1902 | Butterfield et al. | 118—245 X |
| 698,962 | 4/1902 | Julian | 118—249 |
| 777,258 | 12/1904 | Kellner | 118—245 |
| 890,221 | 6/1908 | Davidson et al. | |
| 1,311,491 | 7/1919 | Briggs | 118—415 X |
| 1,849,938 | 3/1932 | Lewis | 118—249 |
| 2,105,981 | 1/1938 | Massey et al. | |
| 2,406,056 | 8/1946 | Barrett | 118—249 |
| 2,606,520 | 8/1952 | Hoel | 118—249 |
| 2,700,364 | 1/1955 | Fischer | 118—249 X |
| 2,749,878 | 6/1956 | Hagen | 118—249 |
| 2,827,010 | 3/1958 | Schaeffer | 118—249 X |
| 3,052,210 | 9/1962 | Hughes | 118—211 X |

FOREIGN PATENTS 187,188  1/1937  Switzerland.

MORRIS KAPLAN, *Primary Examiner.*

RICHARD D. NEVIUS, CHARLES A. WILLMUTH,
*Examiners.*